United States Patent [19]
Huboi et al.

[11] 3,708,676
[45] Jan. 2, 1973

[54] APPARATUS AND METHOD OF SENSING RADIATION DERIVED FROM DIFFERENT PORTIONS OF INFORMATION BEARING MEDIA

[75] Inventors: Robert W. Huboi; Osmond F. Palmer; Bradley D. Rising, all of Rochester, N.Y.

[73] Assignee: Eastman Kodak Company, Rochester, N.Y.

[22] Filed: June 5, 1970

[21] Appl. No.: 43,879

Related U.S. Application Data

[63] Continuation-in-part of Ser. No. 800,351, Feb. 10, 1969, abandoned, which is a continuation of Ser. No. 640,136, May 22, 1967, abandoned.

[52] U.S. Cl. .........250/219 Q, 250/220 M, 250/226, 356/195, 355/38, 355/68
[51] Int. Cl. ............................................G01n 21/30
[58] Field of Search.................356/201–203, 206, 356/195; 250/21, 208, 209, 220 M, 214 P, 221, 222, 226; 355/38, 68; 95/10 CE

[56] References Cited

UNITED STATES PATENTS

| | | | |
|---|---|---|---|
| 3,232,192 | 2/1966 | Stimson | 95/10 CE |
| 3,351,763 | 11/1967 | Shuart | 250/220 M X |
| 3,469,915 | 9/1969 | Thaddey | 355/38 |
| 3,523,728 | 8/1970 | Wick et al. | 355/38 X |
| 3,435,242 | 3/1969 | Kinne | 250/219 WE |
| 3,435,232 | 3/1969 | Sorensen | 250/203 |
| 3,413,065 | 11/1968 | Funk | 356/202 |
| 3,096,176 | 7/1963 | Craig | 356/202 X |
| 3,268,185 | 8/1966 | Eckermann, Jr. | 250/203 X |
| 3,218,909 | 11/1965 | Fain | 250/211 X |

OTHER PUBLICATIONS

White: A semiautomatic Analytical Recording Densitometer; Journal of the SMPTE; Vol. 72; Oct. 1963; pp. 798–803.

*Primary Examiner*—Walter Stolwein
*Attorney*—Robert W. Hampton and R. Lewis Gable

[57] ABSTRACT

Apparatus is disclosed for classifying originals (or information bearing media) to be printed or reproduced. The apparatus includes an assembly having a first radiation sensitive device for sensing the background or peripheral portion of the original, and a second radiation sensitive device responsive to the discrete sub-portions of the central or subject portion of the original to provide a plurality of corresponding signals, and a circuit for selecting one of the plurality of signals having a predetermined relationship to the other of the signals derived from the second radiation sensitive device.

19 Claims, 6 Drawing Figures

PATENTED JAN 2 1973 3,708,676

ROBERT W. HUBOI
OSMOND F. PALMER
BRADLEY D. RISING
*INVENTORS*

BY R. Lewis Gable

Robert W. Hampton

ATTORNEYS

APPARATUS AND METHOD OF SENSING RADIATION DERIVED FROM DIFFERENT PORTIONS OF INFORMATION BEARING MEDIA

CROSS REFERENCE TO RELATED APPLICATIONS

This application is a continuation-in-part of our application Serial No. 800,351, filed February 10, 1969, now abandoned, which was a continuation of our application Serial No. 640,136, filed May 22, 1967, now abandoned.

The present invention relates to photographic printing apparatus, and, more particularly, to an exposure controlling arrangement for such apparatus.

DESCRIPTION OF THE PRIOR ART

There has been a problem when printing originals which have a different exposure or spectral distribution of the subject than that of the foreground or of the background. It is desirable that, when printing, the subject be correctly exposed for both color and density even if it results in the background or foreground being improperly exposed. In prior art exposure determination systems, density corresponding to the average transmission of the entire original (LATD) has determined the exposure and color balance for the print. This has frequently resulted in the wrong exposure and/or color balance of the subject of the print because the background or foreground is significantly different in exposure or spectral distribution. This phenomenon is called "subject failure."

SUMMARY OF THE INVENTION

It is, therefore, an object of the invention to provide a method and apparatus for minimizing subject failure.

It is a further object of the invention to provide apparatus which can correct for subject failure in a multicolored original.

It is an additional object of the invention to provide a method for classifying photographic originals for printing.

These and other objects of the invention are accomplished in one preferred embodiment of the invention by providing a mosaic assembly of photocells. This mosaic assembly comprises a rectangle having a single photocell comprising the area in the vicinity of the perimeter. Within the enclosure formed by this perimetrical photocell, these are a plurality of discrete photocells. The output of each of the discrete photocells and the perimetrical photocell is brought out to a circuit which includes an auctioneering circuit and a summing circuit. The auctioneering circuit determines the output of the discrete photocell with the greatest density. The auctioneering circuit then gives an output which is an analog of the maximum density. This output and the output of the perimetrical photocell are summed together to give a classification output which controls the exposure of the print.

BRIEF DESCRIPTION OF THE DRAWINGS

Referring to the drawings.

DESCRIPTION OF THE PREFERRED EMBODIMENTS

Figure 1:
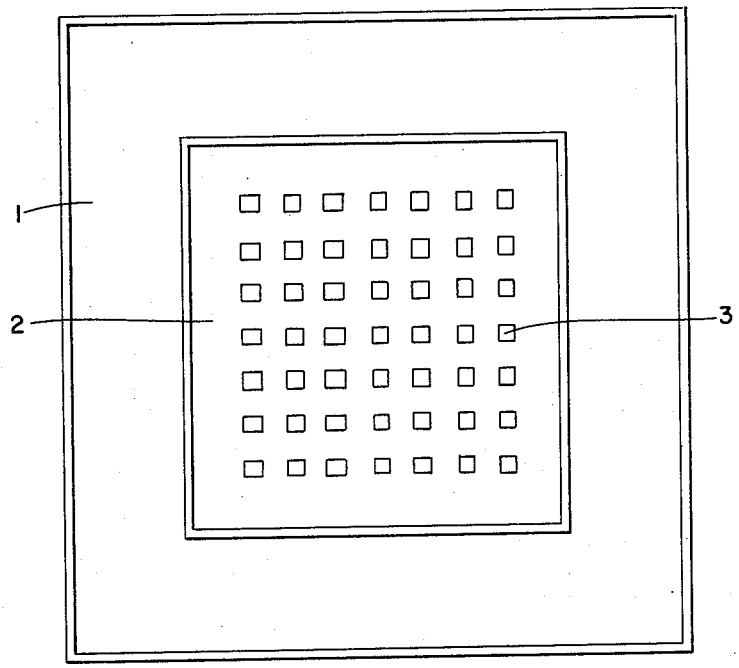
FIG. 1 is a schematic showing of the image reading mosaic array of photocells.

Referring to FIG. 1, there is shown an image reading mosaic array. This mosaic array is designed so that the image of an original can be focused upon it for purposes of determining the densities of the particular areas covered by the respective photocells or photosensitive devices. Perimetrical photocell 1, as its name implies, covers the entire peripheral area of the image reading mosaic within the area encompassed thereby. The group or array of individual discrete photocells is shown at 2, one discrete photocell in particular being identified as 3. Each of the photocells has output conductors (not shown) attached in a manner well known in the art, that are brought to the outside of the image reading mosaic.

Figure 2:
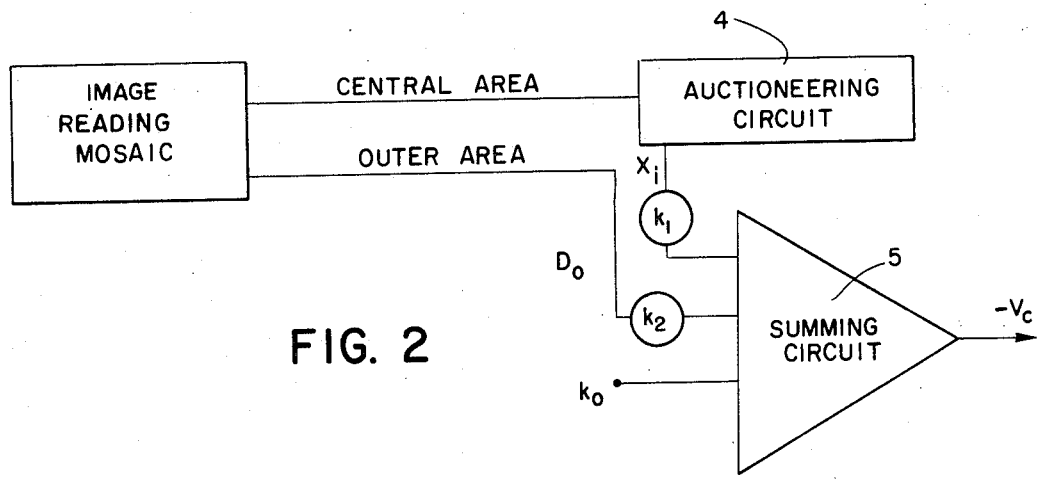
FIG. 2 is a block diagram of the associated circuitry.

FIG. 2 shows a block diagram of a circuit which solves the following exposure control equation:

$$-V_c = k_0 + k_1 X_1 + k_2 D_0$$

where $V_c$ is a voltage signal representing the classification of the photographic original for exposure control; $k_0$ is a constant, and $k_1$ and $k_2$ are coefficients; $D_0$ is an analog voltage signal of the average density read by the outer area of the image mosaic; and $X_1$ is the voltage signal representing the maximum density of the inner or central subject area.

As stated above, the image mosaic array has outputs from each of the photocells. The outputs from the discrete photocells of the inner area are fed to an auctioneering circuit 4. For clarity, only one line has been shown conveying the information from the central area to the auctioneering circuit 4, although it is to be understood that there would be an output conductor for every photocell plus a common bus. Each of the photocells 3 of the array 2 is responsive to a sub-portion of the central area of the image of the photographic original focused upon it for the purpose of determining the densities of the particular sub-portion of the photo-graphic original covered by the respective photocells. The auctioneering circuit connects the photocell which is detecting maximum density to the summing circuit 5. The voltage at the output terminal of the auctioneering circuit 4 is a measure of maximum density (minimum transmittance) of the central subject area portion of the photographic original measured by the array 2 of discrete photocells 3.

Auctioneering circuits per se are well known. A typical circuit of this type has been described by H. H. Koppel in "Transistorized Elements in High Accuracy Control Loops", reprint number T–11, Bailey Meter Company, (presented at 17th Annual Automation Conference, Oct. 15–18, 1962).

As stated hereinbefore, the output signal $D_0$ of the perimetrical photocell 1 is representative of the density corresponding to the average transmittance of the peripheral area of the original. The output signal $D_0$, modified by coefficient $k_2$, the output signal $X_1$ of the auctioneering circuit 4, modified by coefficient $K_1$, and the constant $k_0$, are summed in summing circuit 5 to derive the classification voltage signal $V_c$.

If the printing system utilizes the large area transmission density (LATD) matrix equation method of exposure determination, for determining the spectral density signals R, G and B, it is possible to choose coefficients in the matrix equations that will improve the neutral correction provided by the automatic classifier of the present invention. The equivalent equation for such a system would be:

$$-V_c' = k_0 + k_1 X_i + k_2 D_0 + k_3 R + k_4 G + k_5 B$$

where $k_0$, $k_1$, $k_2$, $X_i$, and $D_0$ represents as in the above equation; $k_3$, $k_4$, and $k_5$ are coefficients; and R, G, and B represent the voltage analog signals of the red, green, and blue LATD's.

The contributions of the $X_i$ and $D_0$ terms may be explained as follows, using a negative original as an example.

Since $X_i$ represents the maximum density of an inner sub-portion of the central area portion of the original, it may be expected to correlate with the density of the principal subject which is most often located near the center of the picture. Probability of good correlation is increased because the measurement does not include the peripheral area which frequently contains extraneous high-density information, such as bright skies, windows, or burned-in foreground objects in photographs taken with flash illumination. In this equation, the $X_i$ term will ordinarily be given a positive coefficient so as to increase the classification, i.e. to print heavier as the value of $X_i$ increases.

The $D_0$ measurement provides a reference for the $X_i$ measurement in two separate ways. Photographically, prints should be denser, i.e., printed more heavily, as the inner maximum density $X_i$ increases with respect to the average density $D_0$ of the peripheral background area of the photographic original. Conversely, the smaller the difference in value between the density signals $X_i$ and $D_0$, the lighter the print should be. Electrically, the $D_0$ receptor (or receptors) will partially compensate for common sources of error such as drift in light source intensity, or temperature drift (if the same type of receptor is used for each measurement). The latter problem might otherwise be a serious source of drift with most types of photoreceptors and could limit the effectiveness of the automatic classifier if only the $X_i$ measurement were used. Full compensation for the above common sources of error effects may be achieved by using equal and opposite coefficients for $X_i$ and $D_0$ with only a slight loss in accuracy of classification.

It is to be understood that the image mosaic array may be composed of photocells of any well-known type, such as photoconductors, or photovoltaic cells.

Although the apparatus has been described showing the image mosaic array to have all its leads brought outside of the array, it would be possible to connect internally all of the interior discrete photocells in series and bring out of the photocell array only the end connections. This would eliminate the necessity for an auctioneering circuit since the maximum density would cause associated photocells to present a very high impedance which would tend to override the low impedances associated with the lesser densities. This method, of course, would not be accurate.

It is within the contemplation of the invention to use an average density value instead of an LATD. This would require multiple photocells in the perimetrical area of the image reading mosaic array instead of the single photocell 1 shown in FIG. 1.

When using the invention for determination of color subject failure, a plurality of color density measurements are needed. In addition to the LATD matrix equation method described above, the plurality of color density measurements for color subject failure determination may be, accomplished by: (1) placing the discrete photocells in groups, each member of the group being sensitive to light of a different color, (2) taking sequential readings by means of image reading mosaic arrays of differing spectral sensitivities, or (3) using beam splitters to simultaneously project the image on mosaic arrays of differing spectral sensitivities. The color exposure and classification information for each color may be determined by the exposure control equation solved by FIG. 2 as shown hereinafter.

Figure 3:
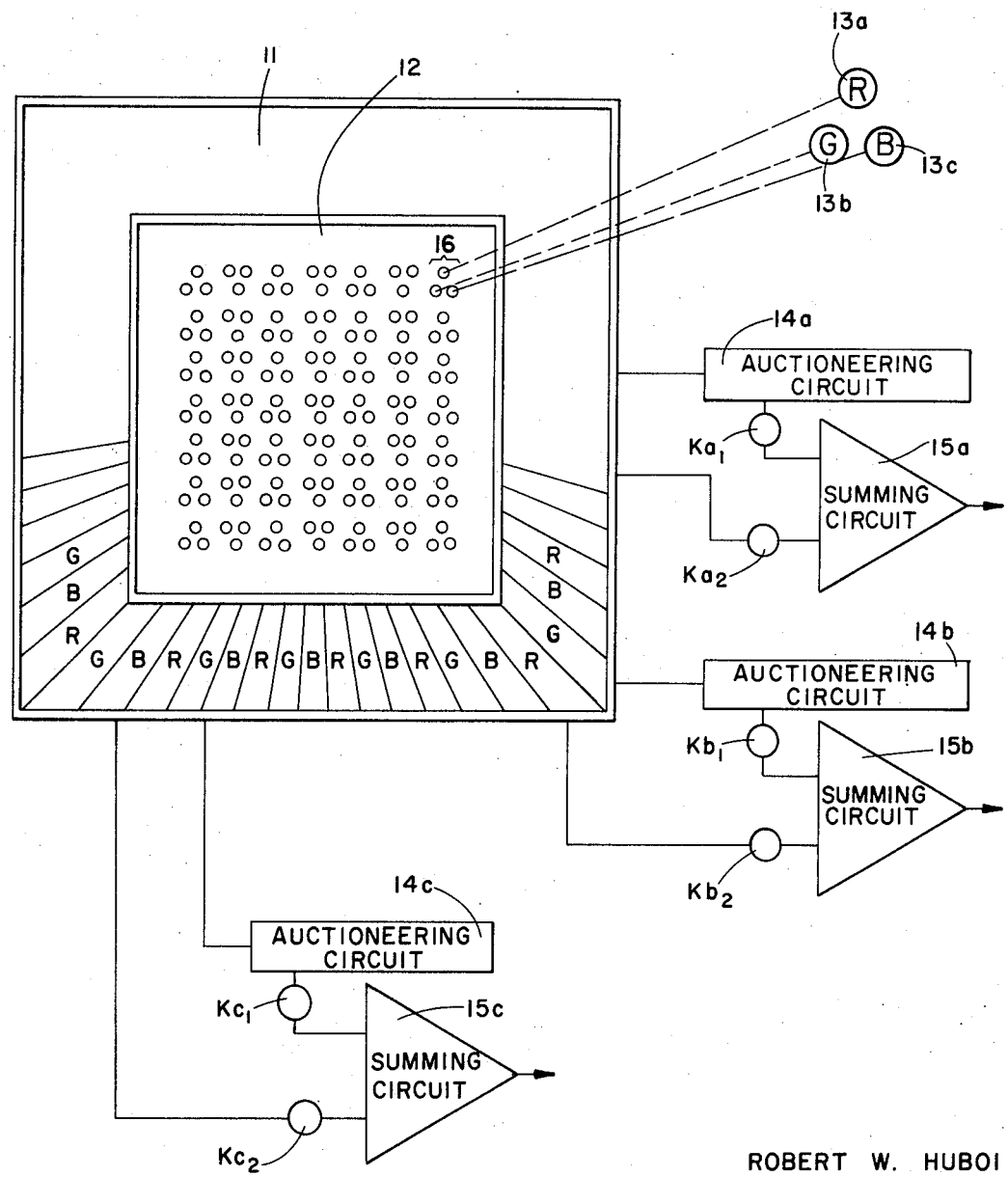
FIGS. 3 and 4 are schematic drawings of image reading mosaics having therein an array of radiation sensitive elements of varying configurations and the associated circuitry for determining color subject failure.

The methods of determining color subject failure as outlined above are carried out by apparatus illustrated in FIGS. 3, 4, 5 and 6. With respect to FIG. 3, there is shown an image reading mosaic having a perimetrical photocell or radiation sensitive array 11 and an inner photocell or radiation sensitive array 12 of a plurality of radiation sensitive assemblies identified by a numeral 16. More specifically, the array 12 is broken up into individual assemblies 16 of radiation sensitive devices or photocells 13a, 13b and 13c. As indicated in FIG. 3, the radiation sensitive devices or photocells 13a, 13b and 13c are respectively responsive to radiation of the red, green and blue wave lengths.

In a manner similar to FIG. 1 described above, the signals developed by the photocells 13a, 13b and 13c are each coupled to auctioneering circuits 14a, 14b and 14c, respectively. Further, the perimetrical photocell array 11 is broken up into a plurality of photocells identified with the letters G, B and R indicating that these photocells are sensitive to radiation of green, blue and red wave lengths. In a manner well known in the art, the photocells marked with the letter R of the perimetrical photocell array 11 are each connected by output conductors to one input $ka_2$ of the summing circuit 15a therefor. A signal indicative of the negative classification for the color red is derived from the summing circuit 15a in a manner similar to that described above with respect to FIG. 2. In a similar fashion, each of the radiation sensitive devices 13b are connected to an auctioneering circuit 14b whereas each of the photocells marked with the letter G of the perimetrical photocell array 11 are connected to an input of the summing circuit 15 b. Similarly, the photocells 13c are each connected to an auctioneering circuit 14c whereas the photocells marked with the letter B of the perimetrical photocell array 11 are connected to one input of a summing circuit 15c.

Figure 4:
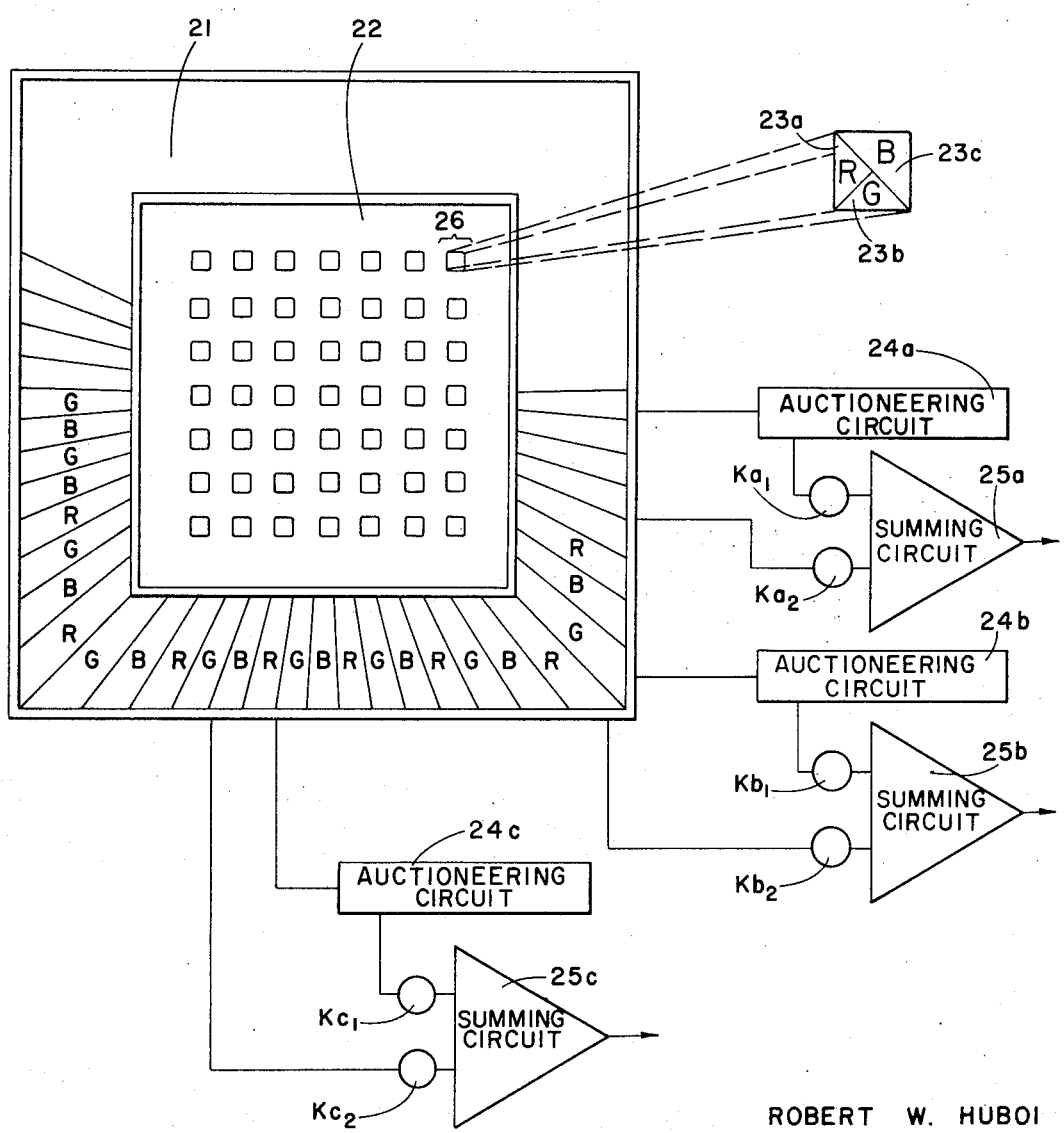

The embodiment shown in FIG. 4 is similar to that shown in FIG. 3 with the exception that the assemblies 26 of radiation sensitive elements are not discrete radiation sensitive devices as shown in FIG. 3 but are configured as shown in FIG. 4. More specifically, the image reading mosaic as shown in FIG. 4 includes a perimetrical photocell array 21 and an array 22 of assemblies 26 of radiation sensitive devices 23. As shown in an exploded view in FIG. 4, the assemblies 26 are divided into radiation sensitive devices 23a, 23b and 23c which are sensitive respectively to the intensities of the red, green and blue wave lengths of radiation directed through the corresponding sub-portions of the central area portion of the photographic original to thereby provide corresponding electrical signals indicative of the respective color densities of the photographic original. The radiation sensitive devices 23 of FIG. 4 are of a triangular configuration and that the radiation sensitive device 23c, sensitive to blue radiation, is made of a larger area to compensate for the inherent lack of sensitivity of the radiation sensitive devices 23c to radiation of the blue wave lengths. In a similar manner to that described above, the radiation sensitive devices 23a and the radiation sensitive devices of the perimetrical photocell array 21 marked with the letter R are connected respectively to an auctioneering circuit 24a and to a summing circuit 25a. Similarly, each of the radiation sensitive devices 23b and the radiation sensitive devices of the perimetrical photocell region 21 marked with the letter G are connected respectively to an auctioneering circuit 24b and to a summing circuit 25b. Likewise, each of the radiation sensitive devices 23c and the radiation sensitive devices marked with the letter B are connected respectively to an auctioneering circuit 24c and a summing circuit 25c.

Figure 5:
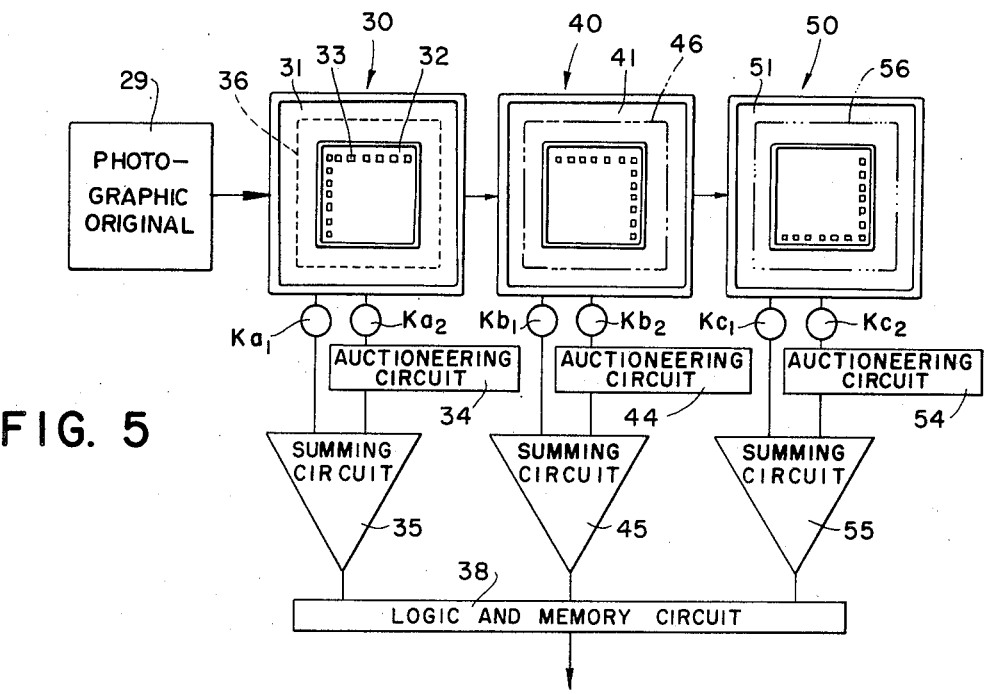
FIG. 5 is a schematic diagram showing a plurality of image reading mosaics in which the original to be sensed, is moved successively from the first to the second to the third mosaic.

As shown in FIG. 5, a single image reading matrix is replaced with a plurality of image reading mosaics 30, 40 and 50 substantially similar to that shown in FIG. 1. More specifically, the image reading mosaic 30 includes a perimetrical photocell array 31, and an array 32 of a plurality of photocells or radiation sensitive devices 33. In operation, an original information bearing medium or photographic original 29 is moved successively to a first position indicated by the numeral 36 at which the image of the photographic original 29 is projected onto the image reading mosaic 30. Then in sequence, the original is moved to second and third positions indicated by the numerals 46 and 56 respectively so that the image of the photographic original 29 may be directed onto the arrays 40 and 50. Exposure control signals representing the negative classification for varying wave-lengths of radiation (e.g., red, green and blue radiation) are derived from summing circuits 35, 45 and 55 and applied to a logic and memory circuit 38. The logic and memory circuit 38 operates to receive the exposure control classification signals and to store these signals as they are derived from the summing circuits. Since the exposure control classification signals are derived from summing circuits 35, 45 and 55 in the manner hereinbefore described with respect to FIG. 2, the logic and memory circuit 38 may take the form of the capacitive memory circuits and logic circuits shown, for example, in U.S. Pat. No. 3,120,782 entitled EXPOSURE CONTROL SYSTEM FOR COLOR PRINTERS. At the end of the sequence of imaging the photographic original 29 onto the mosaics 30, 40 and 50, the logic and memory circuit 38 will read out the stored signals from the capacitive memory circuits so that the proper conditions of exposure of the original 29 may be effected in the reproducing apparatus.

Figure 6:
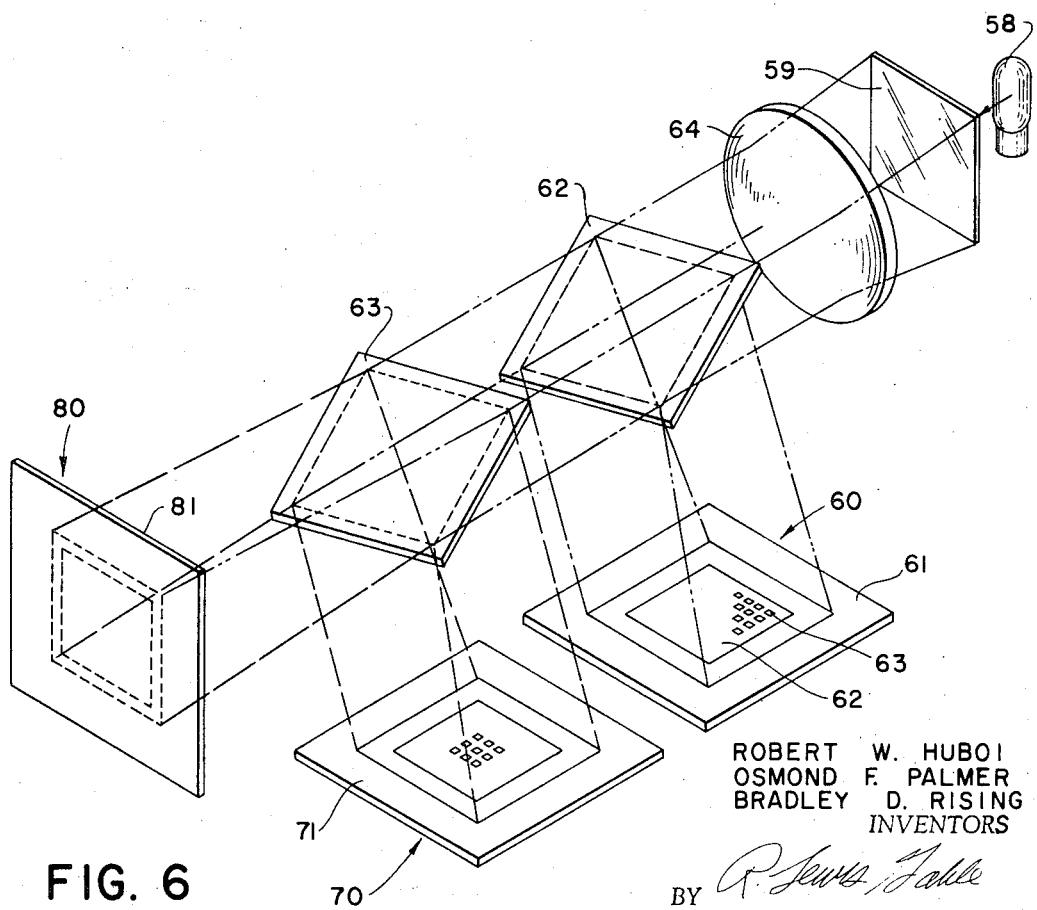
FIG. 6 is a schematic diagram of a plurality of image reading mosaics in which the image of the original is projected onto each of the image reading mosaics.

Instead of moving the original or medium from one position to the next to be sensed by differing mosaics, an original or information bearing medium 59 may be illuminated as shown in FIG. 6 by a source 58 of radiation and the image projected as by a lens assembly 64 onto a plurality of image reading mosaics 60, 70 and 80. More specifically, first and second beam splitters 62 and 63 may be disposed in the projection path to direct the image of the original 59 onto the mosaics 60 and 70 respectively, whereas the transmitted image is directed onto the image reading mosaic 80. The image reading mosaics 60, 70 and 80 are substantially similar to that described in FIG. 1. For example, the image reading mosaic 60 includes a perimetrical photocell 61, and a group 62 or photocells of radiation sensitive devices 63. Though not shown in FIG. 6, suitable auctioneering circuits and summing circuits as described above, are connected to each of the image reading mosaics 60, 70 and 80 to provide exposure control signals indicative of the color classification of the original 59.

In the embodiments shown in FIG. 5 and 6, the image reading mosaics of one illustrative embodiment may be each made sensitive to wave lengths of radiation corresponding to a single color. In the alternative, suitable filters (not shown in the drawings) may be inserted between the original and the image reading mosaics to transmit radiation corresponding to the wavelengths of a single color onto an image reading mosaic. For example, through the use of a filter or by particularly adapting the mosaics, the mosaics 30, 40 and 50 may be adapted to provide signals indicative of the red, green and blue wavelengths of radiation directed through the central subject area portion and the peripheral background area portion of the photographic original.

It is to be noted that the image reading mosaic array may consist of a plurality of photocells, or instead it may be merely a plurality of photosensitive elements having a common substrate.

Experiments have demonstrated that the accuracy of classification provided by the image reading mosaic is equal to, or greater than, the accuracy obtained when performed by average printer operators.

While the invention has been described above with respect to particular embodiments, it will be readily appreciated by those skilled in the art that modifications can be made without departing from the teaching of the present invention. Since other modifications and changes may be suggested to those skilled in the art by the above embodiments of the invention, the invention is not to be limited to the disclosed embodiments, but is of a scope defined by the claims.

We claim:

1. Apparatus for controlling the reproduction in a copying machine of a scene on an information bearing medium having a background area portion and a subject area portion, said apparatus comprising:

a. means for directing radiation upon said scene on said information bearing medium whereby the variable degree of radiation modulation of the scene in the background area portion and the subject area portion varies the intensity of the radiation redirected therefrom as a function of the variable degree of radiation modulation;

b. radiation sensitive means positioned to receive the radiation redirected from said scene and responsive to the radiation redirected from a plurality of sub-portions of the distinct subject area portion of the scene for producing a corresponding plurality of first signals indicative of the degree of radiation modulation of the plurality of discrete sub-portions of the subject area portion, and responsive to the radiation re-directed from the distinct background area portion of the scene for producing a second signal indicative of the degree of radiation modulation of the background area portion of the scene; and c. circuit means responsive to the plurality of first signals and the second signal for controlling the reproduction of the scene in a copying machine as a function of one of said plurality of said first signals having a predetermined relationship to the other of said first signals and as a function of the second signal.

2. The apparatus of claim 1 wherein said circuit means further comprises:

a. first means responsive to the plurality of first signals to select one of said plurality of first signals indicative of a degree of radiation modulation of a sub-portion having a predetermined relationship to the remaining degrees of modulation of the remaining sub-portions indicated by the remaining first signals; and b. second means responsive to the selected first signal and the second signal to produce a reproduction control signal for controlling the reproduction of the information bearing medium in the copying machine in accordance with the degrees of radiation modultion indicated by the first and second signals.

3. The apparatus of claim 1 wherein said first means is responsive to said plurality of first signals to select the one of said plurality of first signals indicative of the lowest intensity of radiation redirected from the respective sub-portion of the subject area portion having the greatest degree of radiation modulation.

4. The apparatus of claim 1 wherein said radiation sensitive means comprises:

a. a plurality of first radiation sensitive devices disposed to receive radiation redirected from the respective plurality of discrete sub-portions of the subject area portion of the scene to provide the plurality of first signals; and b. a second radiation sensitive device disposed to receive radiation redirected from the peripheral background area portion of the scene to provide the second signal.

5. The apparatus of claim 4 wherein the subject area portion corresponds to the central area of the scene and the background area portion corresponds to the peripheral area of the scene.

6. Apparatus for controlling the exposure in a photographic copying machine of photosensitive copy material to a scene on a photographic original as a function of the densities of a distinct background area portion of the scene and a plurality of subportions of a distinct subject area portion, said apparatus comprising:

a. means for directing radiation upon said photographic original whereby the variable density of the scene on the photographic original in the distinct background area portion and the distinct subject area portion varies the intensity of the radiation redirected therefrom;

b. radiation sensitive means positioned to receive the radiation redirected from said photographic original and responsive to the radiation redirected from the plurality of subportions of the distinct subject area portion of the photographic original for producing a corresponding plurality of first signals indicative of the densities of the plurality of discrete subportions of the subject area portion of the scene on the photographic original, and responsive to the radiation redirected from the distinct background area portion of the photographic original for producing a second signal indicative of the density of the background area portion of the scene on the photographic original; and c. circuit means responsive to the plurality of first signals and the second signal for controlling the exposure of photosensitive copy material to the scene on the photographic original in a photographic copying machine as a function of one of said plurality of first signals having a predetermined relationship to the other remaining first signals and as a function of the second signal.

7. The apparatus of claim 6 wherein the subject area portion corresponds to the central area of the scene and the background area portion corresponds to the peripheral area of the scene and the second signal is indicative of the average intensity of radiation redirected therefrom, and the density of, the peripheral background area portion of the photographic original and wherein said circuit means further comprises:

a. first means responsive to said plurality of first signals to select the one of said plurality of first signal indicative of the lowest intensity of radiation redirected from the respective sub-portion having the highest density of said plurality of sub-portions of the central subject area portion of the photographic original; and b. second means responsive to the selected first signal and the second signal to produce an exposure control signal; and c. third means responsive to the exposure control signal for controlling the exposure of the photographic original in a photographic copying machine as a function of the density of the distinct peripheral area portion of the photographic original and as a function of the highest density of the selected discrete sub-portion of the distinct central subject area portion of the photographic original.

8. The apparatus of claim 7 wherein:

a. said first means further comprises auctioneering circuit means responsive to said plurality of first signals to select the one of said plurality of first signals indicative of the lowest intensity of radiation redirected from the respective sub-portion of the central area portion having the greatest density; and b. said second means further comprises summing means for summing the selected first signal and the second signals to produce the exposure control signal.

9. The apparatus of claim 6 wherein said circuit means is responsive to said plurality of first signals to select the one of said plurality of first signals indicative of the lowest intensity of radiation redirected from the respective sub-portion of the central subject area portion having the greatest density.

10. The apparatus of claim 6 wherein said radiation sensitive means further comprises:
  a. a plurality of first radiation sensitive devices disposed to receive radiation redirected from the respective plurality of discrete sub-portions of the central subject area portion of the photographic original to provide the plurality of first signals; and
  b. a second radiation sensitive device disposed to receive radiation redirected from the peripheral background area portion of the photographic original to provide the second signal indicative of the total average intensity of the received radiation and the density of the background area portion.

11. A method for controlling the reproduction of a scene on an information bearing medium in a photocopying machine as a function of the degree of radiation modulation exhibited by a selected discrete sub-portion of the subject area portion of the scene and as a function of the degree of radiation modulation exhibited by the remaining distinct background area portion of the scene, said method comprising the steps of:
  a. directing radiation upon the scene on said information bearing medium;
  b. sensing the radiation redirected from a plurality of distinct sub-portions of the subject area portion of the scene and producing a plurality of first signals indicative of the degree or radiation modulation of each respective subportion of the subject area portion of the scene;
  c. sensing the radiation redirected from the remaining background area portion of the scene and producing a second signal indicative of the degree of radiation modulation of the background area portion of the scene;
  d. comparing the plurality of first signals with respect to each other to select the one of the plurality of first signals indicative of a degree of radiation modulation of a subportion of the subject area portion of the scene having a predetermined relationship with respect to the degrees of radiation modulation of the remaining sub-portions;
  e. combining the selected one of the first signals with the second signal to produce a reproduction control signal; and
  f. controlling the reproduction of the scene on the information bearing medium in the photocopying machine in accordance with the reproduction control signal.

12. A method for controlling the exposure of a photographic original in a photographic printing machine as a function of a selected first signal $X_i$, indicative of the density of a selected discrete sub-portion that bears a predetermined relationship to the other densities of the other discrete sub-portions of the central subject area portion, generally corresponding to the subject area of greatest interest in the scene on the photographic original and as a function of a second signal $D_0$, indicative of the density of the remaining distinct peripheral area portion of the scene, generally corresponding to the background area of lesser interest in the scene on the photographic original, said method comprising the steps of:
  a. directing radiation through the scene on said photographic original;
  b. sensing the radiation directed through a plurality of discrete sub-portions of the central area portion of the scene on said photographic original and producing a plurality of first signals each indicative of the density of each respective sub-portion of the central area portion of the scene;
  c. comparing the plurality of first signals with respect to each other to select the first signal $X_i$ of the plurality of first signals indicative of a density of a discrete sub-portion that bears a predetermined relationship to the other densities of the other discrete sub-portions of the central area portion of the scene;
  d. sensing the radiation directed through the remaining peripheral area portion of the scene on said photographic original and producing a second signal $D_0$ indicative of the density of the peripheral area portion of the scene;
  e. combining the selected first signal $X_i$ with the second signal $D_0$ and a constant signal $k_0$ to produce an exposure control signal $V_c$ in accordance with the following equation:

$$-V_c = k_0 + k_1 X_1 + k_2 D_0;$$

where $k_1$ and $k_2$ are coefficient multiplication factors; and
  f. controlling the exposure of the photographic original in a photographic copying machine in accordance with the exposure control signal $-V_c$.

13. The method of claim 12 wherein said selected first signal $X_i$ is indicative of the lowest intensity of radiation received from the respective sub-portion of the central area portion having the highest density.

14. The method of claim 13 for controlling the exposure of a color photographic original in a color photographic printing machine as a function of the exposure control signal $-V_c$ and primary color density signals $R$, $G$ and $B$ each indicative of the average color density of the entire scene on the photographic original, said method comprising the additional steps of:
  a. sensing the average intensity of the radiation directed to both the central area and peripheral area portions of the scene on said photographic original in first, second and third wavelengths of radiation and producing first, second and third color density signals $R$, $G$ and $B$, respectively, each indicative of the average color density of the entire scene on said photographic original;
  b. combining the exposure control signal $-V_c$ with the first, second and third color density signals $R$, $G$ and $B$, respectively, to produce a color density exposure control signal $-V_c'$, in accordance with the following equation:

$$-V_c' = -V_c + k_3 R + k_4 G + k_5 B;$$

wherein $k_3$, $k_4$ and $k_5$ are coefficient multiplication factors; and c. controlling the exposure of the color photographic original in the color photographic copying machine in accordance with the color exposure control signal $V_c'$.

15. A method for controlling the exposure of a photographic original in a photographic printing machine as a function of selected first and second signals each indicative of the highest density of respective selected discrete sub-portions of the central subject area portion, generally corresponding to the subject area of greatest interest in the scene on the photographic original, measured with respect to first and second wavelengths of radiation, respectively, and as a function of third and fourth signals each indicative of the densities of the remaining distinct peripheral area portion, generally corresponding to the background area of lesser interest in the scene on the photographic original, measured with respect to the first and second wavelengths of radiation, respectively, said method comprising the steps of:

a. directing first and second wavelengths of radiation through the scene on said photographic original;

b. sensing the first wavelengths of radiation directed through a plurality of distinct sub-portions of the central area portion of the scene on said photographic original and producing a plurality of first signals each indicative of the density, measured with respect to the first wavelengths of radiation, of each respective sub-portion of the central area portion of the scene;

c. comparing the plurality of first signals with respect to each other to select the first signal of the plurality of first signals indicative of the highest density sub-portion, measured with respect to the first wavelength of radiation, of the central area portion of the scene;

d. sensing the second wavelength of radiation directed through the plurality of distinct sub-portions of the central area portion of the scene on said photographic original and producing a plurality of second signals each indicative of the density, measured with respect to said second wavelength of radia-tion, of each respective sub-portion of the central area portion of the scene;

e. comparing the plurality of second signals with respect to said other to select the second signal of the plurality of second signals indicative of the highest density sub-portion, measured with respect to said second wavelength of radiation, of the central area portion of the scene;

f. sensing the average intensity of the first wavelength of radiation directed through the remaining peripheral area portion of the scene on said photographic original and producing a third signal indicative of the density measured with respect to said first wavelength of radiation, of the peripheral area portion of the scene;

g. sensing the average intensity of the second wavelength of radiation directed through the remaining peripheral area portion of the scene on said photographic original and producing a fourth signal indicative of the density, measured with respect to said second wavelength of radiation, of the peripheral area portion of the scene;

h. combining the selected first signal with the third signal to produce a first exposure control signal;

i. combining the selected second signal with the fourth signal to produce a second exposure control signal; and j. controlling the exposure of the photographic original in the photographic printing machine to the first wavelength of radiation in accordance with the first exposure control signal and to the second wavelength of radiation in accordance with the second exposure control signal.

16. The method of claim 15 wherein the first and second wavelengths of radiation each correspond to a primary color of light.

17. Apparatus for controlling the exposure in a photographic copying machine of a photographic original to first and second wavelengths of radiation as a function of first and second densities, respectively, of a central subject area portion and a background area portion, said apparatus comprising:

a. means for directing first and second wavelengths of radiation upon said photographic original, whereby the variable first and second densities of the scene on the photographic original in the distinct subject and background area portions vary the intensities of the first and second wavelengths of radiation redirected therefrom as a function of the variable first and second densities, respectively;

b. first radiation sensitive means positioned to receive the first wavelength of radiation redirected from said photographic original and responsive to the first wavelength of radiation received from a plurality of sub-portions of the distinct central area portion of the photographic original for producing a corresponding plurality of first signals indicative of the first densities of the plurality of discrete sub-portions of the central area portion of the scene on the photographic original, and responsive to the first wavelengths of radiation received from the distinct background area portion of the photographic original for producing a second signal indicative of the first density of the background area portion of the scene on said photographic original;

c. second radiation sensitive means positioned to receive the second wavelength of radiation redirected from said photographic original and responsive to the second wavelength of radiation received from the plurality of sub-portions of the distinct central area portion of the photographic original for producing a corresponding plurality of third signals indicative of the second densities of the plurality of discrete sub-portions of the central area portion of the scene on the photographic original, and responsive to the second wavelength of radiation received from the distinct background area portion of the photographic original for producing a fourth signal indicative of the second density of the background area portion of the scene on said photographic original;

d. first circuit means responsive to the plurality of first signals to select one of said plurality of first signals indicative of a first density having a predetermined relationship to the other first densities of the unselected first signals;

e. second circuit means responsive to the plurality of third signals to select one of said plurality of third signals indicative of a second density having a predetermined relationship to the other second densities of the unselected third signals;

f. third circuit means responsive to the selected first signal and the second signal to produce a first exposure control signal for controlling the exposure of the photographic original in the photographic printing machine to the first wavelengths of radiation in accordance with the first densities of the central and background area portions of the scene on said photographic original; and g. fourth circuit means responsive to the selected second signal and the fourth signal to produce a second exposure control signal for controlling the exposure of the photographic original in the photographic printing machine to the second wavelength of radiation in accordance with the second densities of the central and background area portions of the scene on said photographic original.

18. The apparatus of claim 17 wherein:

a. said first circuit means is responsive to said plurality of first signals to select the one of said plurality of first signals indicative of the lowest intensity of the first wavelength of radiation received from the respective sub-portion of the central area portion having the greatest density with respect to said first wavelength of radiation; and b. said second circuit means is responsive to said plurality of third signals to select the one of said plurality of third signals indicative of the lowest intensity of the second wavelength of radiation received from the respective sub-portion of the central area portion having the greatest density with respect to said second wavelength of radiation.

19. The apparatus of claim 18 wherein said first and second radiation sensitive means comprise:

a. first and second respective pluralities of first radiation sensitive devices positioned to receive the first and second wavelengths of radiation, respectively, from the respective plurality of discrete sub-portions of the central area portion of the photographic original to provide the plurality of first and third signals, respectively; and b. first and second respective second radiation sensitive devices disposed to receive first and second wavelengths of radiation from the peripheral background area portion of the photographic original to provide the second and fourth signals, respectively.

* * * * *